United States Patent [19]
Dijkema

[11] 3,728,899
[45] Apr. 24, 1973

[54] PRESSURE GAUGE

[75] Inventor: Leendert Frederik Willem Dijkema, Rotterdam, Netherlands

[73] Assignee: Heineken Brouwerijen N.V., Amsterdam, Netherlands

[22] Filed: Feb. 17, 1972

[21] Appl. No.: 227,081

[52] U.S. Cl....................................73/393, 73/411
[51] Int. Cl.............................G01l 19/04, G01l 7/04
[58] Field of Search.....................73/411, 418, 393, 73/414, 412, 413

[56] References Cited

UNITED STATES PATENTS

| 3,267,734 | 8/1966 | Marks | 73/414 |
| 3,370,470 | 2/1968 | Neugebauer | 73/414 |

*Primary Examiner*—Donald O. Woodiel
*Attorney*—Eugene E. Geoffrey, Jr.

[57] ABSTRACT

In a pressure gauge of the Bourdon type wherein the gas pressure to be measured is compared with a reference pressure, the reference pressure being provided by a saturated vapor pressure, which liquid shows at least substantially the same characteristic under the influence of temperature and atmospheric pressure variations as the gas to be gauged.

6 Claims, 3 Drawing Figures

PATENTED APR 24 1973 3,728,899
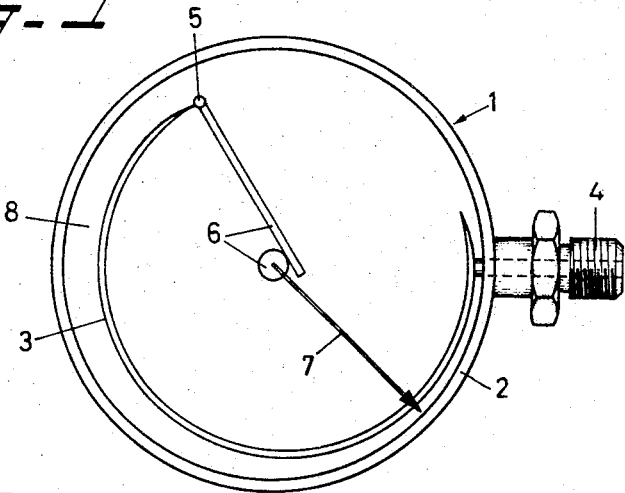
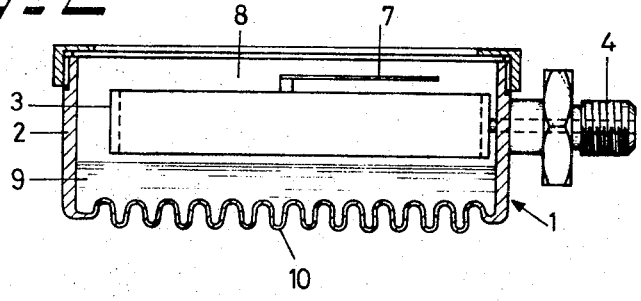
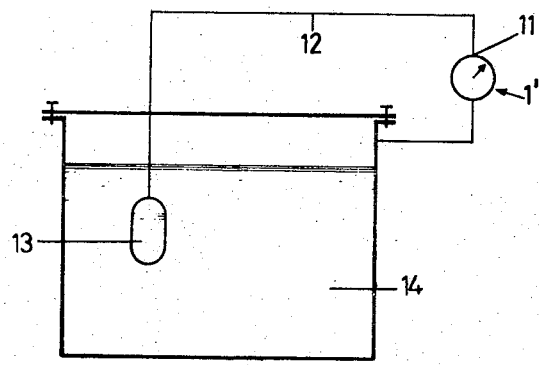

PRESSURE GAUGE

The invention relates to a pressure gauge for gauging the equilibrium pressure of carbon dioxide dissolved in a liquid, which pressure gauge includes a housing containing an element loadable on one side by the carbon dioxide pressure and on the other side by a reference load, the element being deformable in response to a pressure differential.

During the manufacture of carbonated beverages such as beer and lemonade, the carbon dioxide content is often checked and corrected by gauging and adjusting the carbon dioxide equilibrium pressure. The carbon dioxide content can be derived from the gauged equilibrium pressure and the temperature at which the gauging has taken place. In the devices with which the gaugings are conducted, the pressure gauge referred to in the opening paragraph of this specification is often a conventional Bourdon type pressure gauge in which the reference load is the atmospheric pressure and which consequently only indicates the correct pressure if the atmospheric pressure is 760 mm mercury. When the barometer reading varies substantially within a short period, for example, if an area of high pressure is rapidly followed by an area of very low pressure, the measured equilibrium pressure will be affected so that the carbon dioxide content calculated from the information obtained will be wrong. For example, if the barometer height should be 780 mm and a carbon dioxide content of 0.48 percent by weight should be gauged, a carbon dioxide content of 0.51 percent by weight would be found in the same liquid. However, if the height of the barometer should be 720 mm the error would be larger. Carbon dioxide gaugings in elevated areas such as Spain, Switzerland or Italy where the height of the barometer is relatively low, even greater errors are experienced.

It is known per se, in order to avoid the drawbacks of variations in the atmospheric pressure serving as reference pressure, that a constant gas pressure may be used as a reference pressure. This is objectionable in that both the reference pressure and the equilibrium pressure to be gauged do not change in the same degree with temperature variations.

The object of the invention is to provide a pressure gauge of the type defined above which is neither dependent on the atmospheric pressure nor on the working temperature.

To this end the housing of the pressure gauge according to the invention contains as a reference pressure an atmosphere of the saturated vapor of a liquid to load one side of the deformable element and which vapor pressure under the influence of temperature variations shows at least substantially the same characteristics as the equilibrium pressure of carbon dioxide dissolved in the liquid.

Since in each manufacturing process the temperature will fluctuate only within a certain range, it is possible, in an elaboration of the invention, to select as a reference liquid, a liquid having a boiling point such that the vapor pressure within the range in which the temperature variations occur during the several gaugings varies in at least substantially the same manner as the equilibrium pressure of the carbon dioxide.

According to the invention, in gauging the equilibrium pressure of carbon dioxide in beer at a temperature between $-1°C$ and $+4°C$, the reference liquid can be n-butane. In case of a change in temperature, the vapor pressure of n-butane is approximately parallel to the carbon dioxide equilibrium pressure. For each degree centigrade the vapor pressure of n-butane rises about 0.053 atm and is substantially linear from $0°$ to $20°C$.

If carbon dioxide is gauged at a somewhat higher temperature, for example in lemonade, at a temperature of $8°$ to $10°C$, the reference liquid according to the invention may be a liquid other than butane, having a higher boiling point, for example, dimethylamine, a liquid which has the same pressure characteristic as n-butane.

Furthermore, the space on the side of the deformable element loadable by the reference pressure of the pressure gauge according to the invention can be filled partly with the reference liquid which in the pressure gauging device is kept in heat-exchanging contact with the liquid in which the carbon dioxide is dissolved.

In a gauge which is frequently used for the purpose defined above, namely a Bourdon gauge, at least one wall of the housing can be provided, according to the invention, with elements for promoting heat exchange between reference liquid present in the housing and the carbon dioxide containing liquid.

According to the invention, a Bourdon manometer can also be filled solely with the saturated vapor of the reference liquid and can be connected via a pressure conduit to a reservoir containing the reference liquid and immersible in the carbon dioxide solution.

Whereas with the prior Bourdon gauge which is used in breweries, the carbon dioxide contents must be determined by correcting indicated pressure values by the use of a temperature pressure table. With the gauge according to the invention, the temperature-corrected pressure value is indicated directly and the gauge may even be provided with a scale indicating carbon dioxide percentages.

One embodiment of a Bourdon gauge for gauging the carbon dioxide equilibrium pressure in a carbonated beverage will be described with reference to the drawing.

In the Drawings:

FIG. 1 is a top view of a Bourdon gauge with the scale removed;

FIG. 2 is a side view in partial section of the gauge shown in FIG. 1, and

FIG. 3 shows a pressure gauging arrangement using a modification of the gauge shown in FIGS. 1 and 2.

As shown in the drawing, the Bourdon gauge 1 comprises a housing 2 in which the hollow Bourdon spring 3 extends. The interior of the hollow spring 3 is connected via a connection 4 with the space in which the carbon dioxide equilibrium pressure must be gauged. At increasing pressure the spring 3 deforms to such an extent that the free end 5 of the spring 3 moves radially outwardly. The movement is converted via a linkage rotary motion of the pointer 7 over a dial (not shown).

In prior Bourdon gauges, the atmospheric pressure prevails in the interior of the housing 2. In the gauge according to the invention the interior of the housing 2 is filled for about one-third of its volume with N-butane liquid and the remaining upper part 8 of the interior of the housing 2 is filled with the saturated vapor of the butane liquid.

In the embodiment shown in FIGS. 1 and 2, the bottom 10 of the gauge above which there is a layer 9 of butane liquid, includes means for promoting heat exchange, for example ribs. In this embodiment the gauge can therefore be held with the bottom in the beer to be gauged so that the butane liquid will always be at the same temperature as the beer.

The equilibrium pressure of the carbon dioxide of the beer indicated by the pointer 7 will therefore be temperature-corrected so that only the equilibrium pressure must be converted into the carbon dioxide content. However, use can be made of a scale in which this conversion is included and which will consequently directly indicate the weight in percent of dissolved carbon dioxide.

Suppose that the pointer of the gauge has been adjusted to indicate the correct carbon dioxide content at 1°C, namely, 0.52 percent by weight,
then the reading at
 −1.0°C will be 0.511 percent by weight;
 at 0.0°C will be 0.516 percent by weight;
 at +1.0°C will be 0.520 percent by weight;
 at +2.0°C will be 0.523 percent by weight;
 at +3.0°C will be 0.528 percent by weight;
 at +4.0°C will be 0.532 percent by weight.
These small deviations are completely negligible.

In the pressure gauging arrangement shown in FIG. 3 in accordance with the invention, use is made of a modified embodiment of the gauge to ensure that the butane is always kept at the correct temperature. The Bourdon gauge 1', which need not have ribs or other heat-exchanging means in the bottom end is provided with a connection 11 to which a pressure conduit 12 is attached. The other end of the pressure conduit 12 is attached to a reservoir 13 filled with butane liquid. The reservoir 13 is immersed in the beer 14. In this manner the temperature of the butane liquid is maintained equal to that of the beer. The conduit 12 can extend helically in the liquid to be gauged.

What is claimed is:

1. A pressure gauge for gauging the equilibrium pressure of carbon dioxide dissolved in a liquid comprising a housing containing an element loadable on one side by the carbon dioxide pressure and on the other side by a reference pressure and deforming under the pressure differential, said housing containing an atmosphere of the saturated vapor of a reference liquid to produce said reference pressure on said other side of the deformable element, the vapor pressure of said reference liquid under the influence of temperature variations showing substantially the same characteristic as the equilibrium pressure of carbon dioxide dissolved in the first said liquid.

2. A pressure gauge according to claim 1 arranged for gauging the equilibrium pressure of carbon dioxide in beer at a temperature between −1° and +4°C wherein the reference liquid is n-butane.

3. A pressure gauge according to claim 1 arranged for gauging the equilibrium pressure of carbon dioxide in lemonade at a temperature of 8° − 10°C wherein the reference liquid is dimethylamine.

4. A pressure gauge according to claim 1 wherein the space on the side of the deformable element loadable by the reference pressure is partly filled with said reference liquid, and said pressure gauging device is kept in heat-exchanging contact with the liquid in which the carbon dioxide is dissolved.

5. A pressure gauge according to claim 1 wherein the pressure gauge is a Bourdon gauge and at least one wall of the housing is provided with elements for promoting heat exchange between reference liquid present in the housing and the liquid containing the carbon dioxide.

6. A pressure gauge according to claim 1 wherein the pressure gauge is a Bourdon gauge, said housing is solely filled with the saturated vapor of the reference liquid and is connected via a pressure conduit to a reservoir containing the reference liquid, said reservoir being immersible in the liquid containing the carbon dioxide.

* * * * *